(12) United States Patent
Biskeborn et al.

(10) Patent No.: US 7,248,438 B2
(45) Date of Patent: Jul. 24, 2007

(54) COMPRESSION ZONE RECORDING HEAD (75) Inventors: Robert Glenn Biskeborn, Hollister, CA (US); Jason Liang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 10/736,856

(22) Filed: Dec. 15, 2003

(65) Prior Publication Data
US 2005/0128640 A1 Jun. 16, 2005

(51) Int. Cl.
*G11B 5/10* (2006.01)
(52) U.S. Cl. .................................................. 360/129
(58) Field of Classification Search ................ 360/129, 360/121, 130.21
See application file for complete search history.

(56) References Cited

U.S. PATENT DOCUMENTS

| | | | | |
|---|---|---|---|---|
| 3,665,436 A * | 5/1972 | Murray et al. | ............... | 360/122 |
| 5,404,260 A * | 4/1995 | Machui et al. | ............... | 360/126 |
| 5,781,383 A | 7/1998 | Strand | ........................ | 360/122 |
| 5,883,770 A | 3/1999 | Biskeborn et al. | ..... | 360/130.21 |
| 5,905,613 A | 5/1999 | Biskeborn et al. | ..... | 360/130.21 |
| 6,151,191 A | 11/2000 | Muftu et al. | ................. | 360/107 |
| 6,341,416 B1 | 1/2002 | Biskeborn et al. | ........ | 29/603.12 |
| 6,760,177 B2 * | 7/2004 | Biskeborn | ..................... | 360/71 |
| 7,116,519 B2 * | 10/2006 | Koeppe et al. | ............. | 360/129 |
| 2002/0075594 A1 | 6/2002 | Aoki | ............................ | 360/122 |
| 2003/0039069 A1 | 2/2003 | Biskeborn | ..................... | 360/129 |
| 2007/0047141 A1 * | 3/2007 | Biskeborn et al. | .......... | 360/129 |

* cited by examiner

*Primary Examiner*—Allen Cao
(74) *Attorney, Agent, or Firm*—William D. Gill; Jeffrey P. Aiello (57) ABSTRACT

A compression zone recording head is provided having the recording tape in contact or near contact with the recording read/write transducer elements in a compression zone of the tape passing over a transducing surface. The compression zone recording head comprises a flat or shallow contour head having a thin, hard, preferably conducting closure to provide wear protection to the transducers. In one embodiment of the invention, the transducers are located in a compression zone region where the recording tape contacts an edge of the transducing surface at a controlled wrap angle. In another embodiment, the transducers are located in a canopy zone region of the transducing surface due to bending of the tape due to the overwrap. The protective closure is preferably made of sputter deposited Al—Fe—Si, or alternatively of a deposited or bonded layer of Al—Fe—Si, Al—O—Ti—C, Zr—O—Ti, Si—N, Si—C or Zr—O.

12 Claims, 5 Drawing Sheets

COMPRESSION ZONE RECORDING HEAD

BACKGROUND OF THE INVENTION

1. Field of the Invention

This invention relates to magnetic tape recording heads, and more particularly to a compression zone recording head.

2. Description of the Related Art

In magnetic storage systems, data is read from and written onto magnetic recording media utilizing magnetic transducers commonly referred to as magnetic heads. Data is written on the magnetic recording media by moving a magnetic recording head to a position over the media where the data is to be stored. The magnetic recording head then generates a magnetic field, which encodes the data into the media. Data is read from the media by similarly positioning the magnetic read head and then sensing the magnetic field of the magnetic medial. Read and write operations are independently synchronized with the movement of the media to ensure that the data can be read from and written to the desired location on the media.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. This movement generally entrains a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are in intimate or near contact with the tape to effect efficient signal transfer, and so that the read element is in intimate or near contact with the tape to provide effective coupling of the magnetic field from the tape to the read element. The conventional head contour comprises a cylindrical or complex shape which is critical in maintaining the moving tape at the desired spacing from the head. The contact, or near contact, spacing is maintained by controlling the contour shape to "bleed", or scrape the boundary layer of air carried by the tape away and into bleed slots before encountering the transducer to prevent the tape from "flying", or losing contact with the transducer.

Alternatively, the contour is designed with a small radius and a high wrap angle so that high pressure is exerted on the head while the tension is low. However, the contour of the head must be such that the pressure exerted by the tape on the transducer is not so high that the surface of the transducer wears excessively. Heads are often provided with outriggers on both sides of the head which help support the tape and reduce head wear, but, more importantly, control the wrap angle of the tape with respect to the head. Any change in radius will change the pressure of the tape on the head at the same tape tension.

A flat contour thin film tape recording head for a bi-directional tape drive is described in commonly assigned U.S. Pat. No. 5,905,613 to Biskeborn and Eaton which is incorporated by reference herein. The flat contour head comprises a flat transducing surface on a substrate having a row of thin film transducers formed on a surface on one side of the substrate which forms a gap. The substrate with the row of transducers is called a "rowbar substrate". The transducers are protected by a closure of the same or similar ceramic as the substrate. For a read-while-write bi-directional head which requires that the read transducer follows behind the write transducer, two rowbar substrates with closures are mounted in a carrier facing one another. The recording tape overwraps the corners of both substrates with an angle sufficient to scrape the air from the surface of the tape and not so large as to allow air to reenter between the tape and the transducing surface after the tape passes the corner. By scraping the air from the surface of the moving tape, a vacuum forms between the tape and the flat transducing surface holding the tape in contact with the transducing surface. At the corners of the substrates, bending of the recording tape due to the overwrap results in separation of the tape from the transducing surface for a distance that depends on the wrap angle, the tape thickness and the tape tension. The transducers must be spaced from the corners of the substrate at a sufficient distance to allow the vacuum between the tape and the transducing surface to overcome this separation.

There is an ongoing need for reduced separation of the transducers and the recording media and of improved control and reliability of this separation in order to support constantly increasing data density and speed requirements of data storage systems. The present invention provides an improved recording head to address this need.

SUMMARY OF THE INVENTION

In accordance with the principles of the present invention, there is disclosed a compression zone recording head comprising a flat contour, or alternatively, a shallow contour head having a thin closure preferably formed of conducting material. The recording tape wraps over the deposited closure and after a short time wears into intimate rubbing contact with the recording elements. The edge of the wafer holding the recording elements provides the required durable support of the recording tape. Thus, the tape contacts the recording elements in a "compression zone" at the leading or trailing edge of the head in contrast to a conventional flat profile tape head wherein the closure has substantially the same dimensions as the substrate supporting the wafer resulting in the tape flying over the recording elements in a "tack-down zone" away from the edges of the head. The compression zone recording head provides advantages of lower flying height. In addition, using a thin film deposited closure lowers the cost of fabrication since the closure is formed in a simple thin film process and fabrication is nearly identical to slider fabrication for direct access storage devices (DASD).

In a first embodiment, the low flying height of the compression zone recording head is achieved by having the tape compressed on the transducer elements in the compression zone at the edge of the head. The deposited closure of hard material controls element wear and recession from the tape after prolonged use. The preferred use of conductive material to form the closure helps to control triboelectric head-tape interactions by clamping the electric potential of the closure to a desired value or to an electrical feedback value.

The above as well as additional objects, features, and advantages of the present invention will become apparent in the following detailed description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

Figure 1:
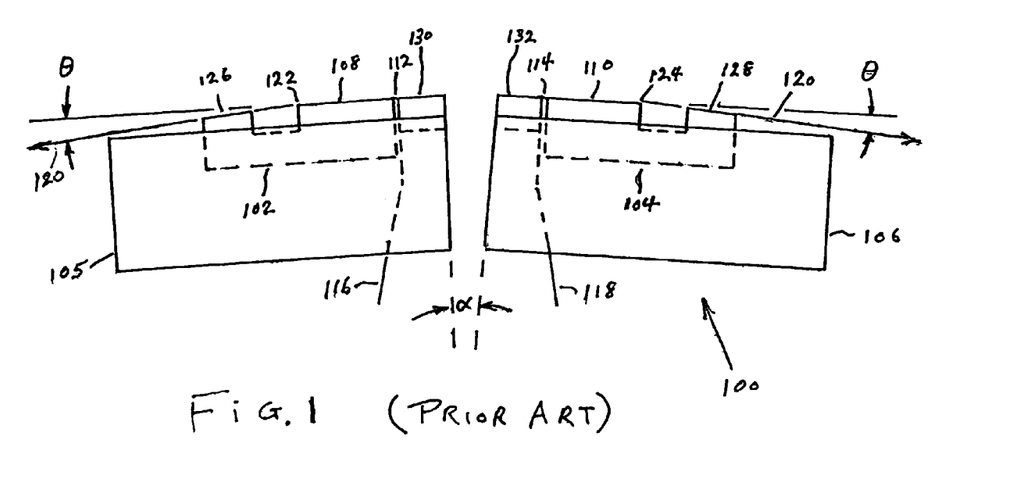
FIG. 1 is an end view illustration, not to scale, of a conventional read-while-write bi-directional flat contour linear tape recording head.

FIG. 1 illustrates a prior art bi-directional read-while-write flat contour head 100. Rowbar substrates 102 and 104 of a wear resistant material, such as the substrate ceramic typically used in magnetic disk drive heads, are mounted in carriers 105 and 106 fixed at a small angle a with respect to each other. The ceramic rowbar substrates 102 and 104 are provided with flat transducing surfaces 108 and 110 and a row of transducers at the surfaces of gaps 112 and 114. Electrical connection cables 116 and 118 connect the transducers to the read/write channel of the associated tape drive. To control the overwrap angle θ of the tape 120 at edges 122 and 124, outriggers 126 and 128 lapped at the desired wrap angle are provided. The wrap angle going onto the flat transducing surface is usually between ⅛ degree and 4.5 degrees. The rows of transducers are protected by closures 130 and 132 made of the same or similar ceramic as the rowbar substrates 102 and 104.

Figure 2:
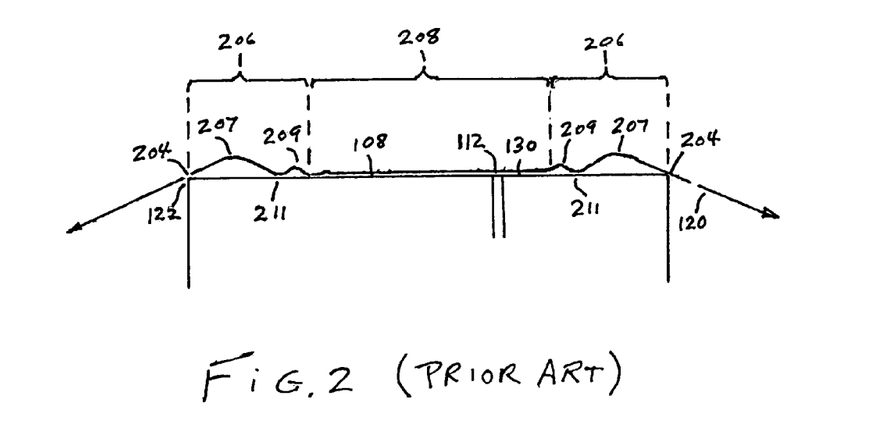
FIG. 2 is an end view illustration, not to scale, depicting the separation of the tape from a conventional bi-directional flat contour tape recording head.

FIG. 2 illustrates flat transducing surface 108 of the flat contour head 100 of FIG. 1. As the tape 120 moves from left-to-right or from right-to-left over the flat transducing surfaces 108, the tape separation from the transducing surface is different in different zones across the surface. At the edges 122 and 123, the overwrap angle results in bending of the tape to conform to the flat transducing surfaces in a narrow "compression zone" 204 where the tape is in contact with the edges 122 and 123, the compression zone having a effective length of about 0.1-10 microns, increasing to 15-45 microns over the life of the head. By scraping the air from the surface of the moving tape, a vacuum forms between the tape and the flat transducing surface holding the tape in contact with the transducing surface; however, bending of the recording tape due to the overwrap results in separation of the tape from the transducing surface in a "canopy zone" 206 for a distance that depends on the wrap angle, the tape thickness and the tape tension and speed. For typical values of tape tension and tape thickness and wrap angles in the range of ½-2 degrees, the canopy zone distance is in the range of 10-200 microns. The canopy zone 206 comprises a primary separation zone 207 and a smaller amplitude secondary separation zone 209 having a contact or near contact "crow bar zone" 211 in between. In a "tack-down zone" 208, the vacuum between the tape and the transducing surface is sufficient to overcome this separation and the tape 120 is in contact or near contact with the flat transducing surface 108 and 110. In the flat contour head 100, the transducers are positioned at the gaps 112 and 114 in the tack-down zones 208 where the tape is in contact or near contact. However, intermittent tape separation caused by vibration, surface roughness or air entrainment effects results in some degradation of read and write performance of these heads.

Figure 3:
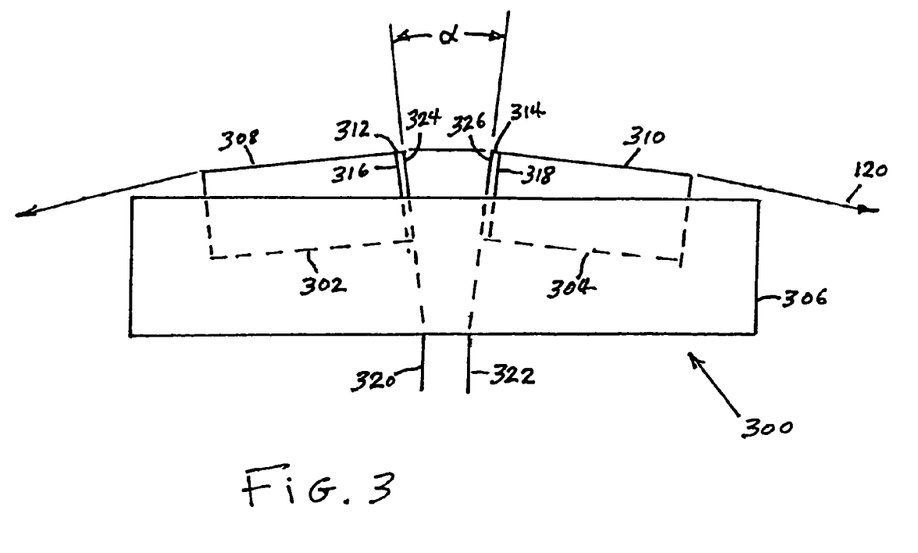
FIG. 3 is an end view illustration, not to scale, of a first embodiment of a compression zone recording head.

FIG. 3 illustrates a first embodiment of a compression zone recording head 300 according to the present invention. The head 300 comprises rowbar substrates 302 and 304 of a wear resistant material, such as the substrate ceramic typically used in magnetic disk drive heads, are fixed in a carrier 306 at a small angle α with respect to each other. The ceramic rowbar substrates 302 and 304 are provided with flat transducing surfaces 308 and 310. Rows of transducers 316 and 318 are provided at the surfaces of gaps 312 and 314. Electrical connection cables 320 and 322 connect the transducers to the read/write channel of the associated tape drive. The rows of transducers are protected by thin closures 324 and 326 made of a layer of hard, preferably conductive, material such as Al—Fe—Si (Sendust) deposited over the row of transducers, or alternatively of a layer of Al—O—Ti—C, Zr—O—Ti, Si—N, Si—C or Zr—O deposited or bonded to the row of transducers.

Figure 4:
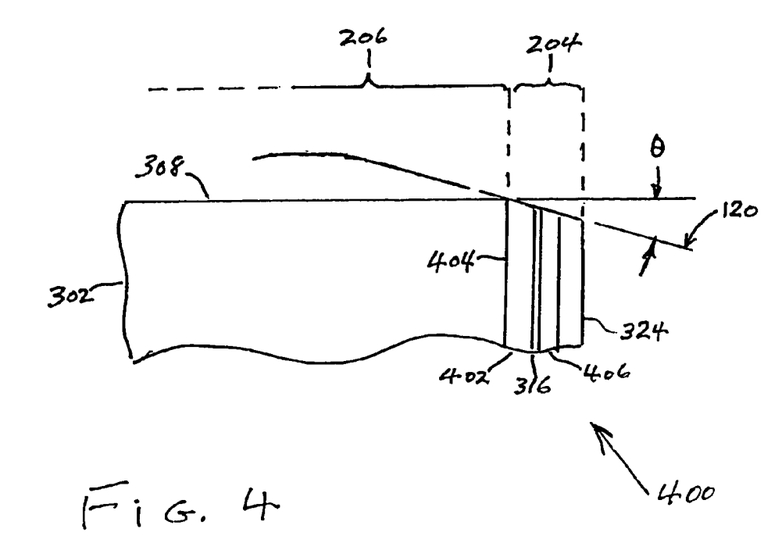
FIG. 4 is an end view illustration, not to scale, of an end portion of the compression zone recording head of FIG. 3.

FIG. 4 illustrates an enlarged portion 400 of the row substrate 302 showing detail of the row of transducers 316 and the thin closure 324 in the compression zone 204 of the head 300 of FIG. 3. The row of transducers 316 is formed on an alumina substrate 402 deposited on the edge 404 of the ceramic rowbar substrate 302. The closure 324 may be sputter deposited on the insulation layer 406 which protects the row of transducers 316 and is preferably formed of a layer of Al—Fe—Si having a thickness in the range of 0.1-10 microns. Alternatively, the closure 324 may be formed of a thin layer of Al—O—Ti—C, Zr—O—Ti, Si—N, Si—C or Zr—O deposited on or bonded to the insulation layer over the row of transducers. The tape 120 wraps over the deposited closure 324 at the flat transducing surface 308 at an overwrap angle θ and after a short run time wears into intimate rubbing contact with the recording elements of the row of transducers. The edge of the ceramic rowbar provides the necessary durable support. Thus, the tape contacts the recording elements in the so-called compression zone 204. In contrast, in a conventional flat profile head the tape passes over the elements in the so-called tack zone away from the edges of the head.

The advantages of the compression zone recording head 300 of the present invention are a reduced tape-to-transducer spacing and lower cost of fabrication since the closure may now be formed by a simple thin film deposition process and head fabrication is nearly identical to DASD slider fabrication well known to the art. The reduced tape to transducer spacing is achieved by having the tape compressed on the elements. The deposited or bonded closure protects the elements from rapid wear and recession from the tape during use. In addition, the closure is preferably conductive to control triboelectric head-tape interactions by clamping the electrical potential of the closure to a desired value or to an electrical feedback value.

Figure 5:
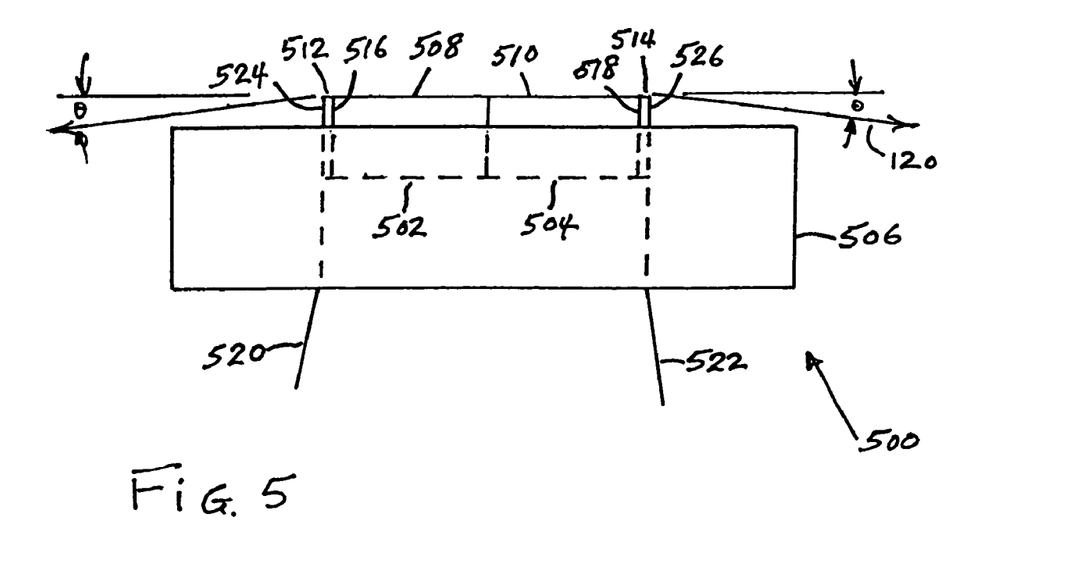
FIG. 5 is an end view illustration, not to scale, of an second embodiment of a compression zone recording head.

FIG. 5 illustrates a second embodiment of a compression zone recording head 500 according to the present invention. The head 500 comprises rowbar substrates 502 and 504 of a wear resistant material, such as the substrate ceramic typically used in magnetic disk drive heads, fixed in a carrier 506. The ceramic rowbar substrates 502 and 504 are provided with flat transducing surfaces 508 and 510 that lie in the same plane, or alternatively, are separated from one another and form a small angle (not shown) with respect to each other. Rows of transducers 516 and 518 are provided on the surfaces of gaps 512 and 514 at the outer edges of substrates 502 and 504. Electrical connection cables 520 and 522 connect the transducers to the read/write channel of the associated tape drive. The rows of transducers 516 and 518 are protected by thin closures 524 and 526, respectively, made of a layer of hard, preferably conductive, material such as Al—Fe—Si (Sendust) deposited over the insulation layer on the row of transducers, or alternatively, of a layer of Al—O—Ti—C, Zr—O—Ti, Si—N, Si—C or Zr—O deposited on or bonded to the insulation layer on the row of transducers. To control the overwrap angle θ of the tape 120 at edges of the closures 524 and 526, outriggers (not shown) lapped at the desired wrap angle may be formed on the carrier 506 or the angle can be established using adjustable position guides. The head 500 differs from the head 300 in having the closures 512 and 514 facing out (away from each other) instead of facing in (toward each other) as is the case for the closures 312 and 314 in the head 300. In the head 500, the closures, and therefore the gaps of the recording elements of the transducer rows are further apart than in the head 300 design and are more susceptible to dynamic tape skew problems. The transducers 516 and 518 may be formed on opposite sides of a single wafer, thereby providing a single substrate rather than having two substrates 502 and 504.

Figure 6:
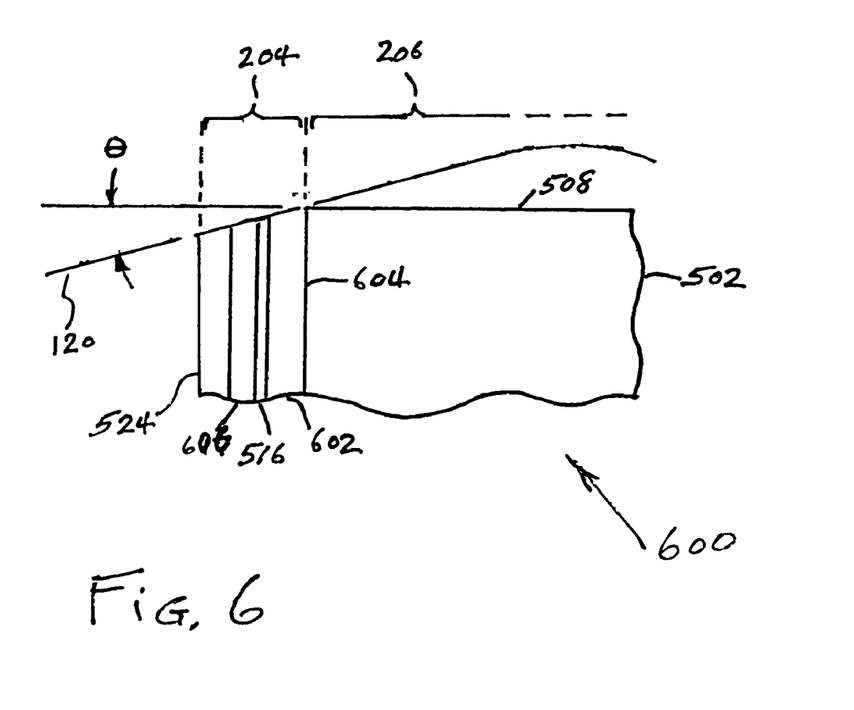
FIG. 6 is an end view illustration, not to scale, of an end portion of the compression zone recording head of FIG. 5.

FIG. 6 illustrates an enlarged portion 600 of the row substrate 502 showing detail of the row of transducers 516 and the thin closure 524 in the compression zone 204 of the head 500 of FIG. 5. The row of transducers 516 is formed on an alumina substrate 602 deposited on the edge 604 of the ceramic rowbar substrate 502. The closure 524 may be sputter deposited over the insulation layer 606 on the row of transducers 516 and is preferably formed of a layer of Al—Fe—Si having a thickness in the range of 0.1-10 microns. Alternatively, the closure 524 may be formed of a thin layer of Al—O—Ti—C, Zr—O—Ti, Si—N, Si—C or Zr—O deposited on or bonded to the insulation layer on the row of transducers. The tape 120 wraps over the deposited closure 524 at the flat transducing surface 508 at an overwrap angle θ and after a short run time wears into intimate rubbing contact with the recording elements of the row of transducers. The edge of the ceramic rowbar provides the necessary durable support. Thus, the tape contacts the recording elements in the so-called compression zone 204.

Figure 7:
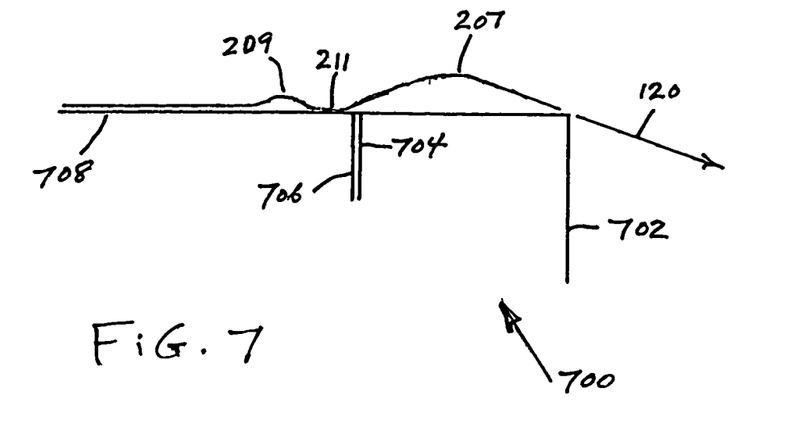
FIG. 7 is an end view illustration, not to scale, of an end portion of a near crow-bar zone recording head.
Figure 8:
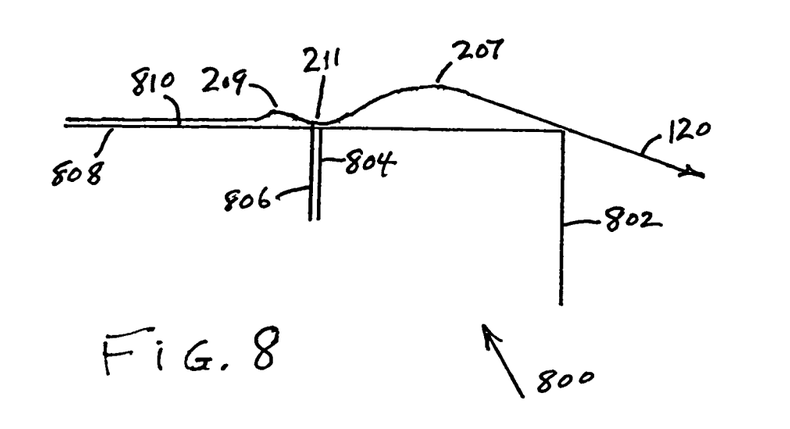
FIG. 8 is an end view illustration, not to scale, of an end portion of a crow-bar zone recording head.
Figure 9:
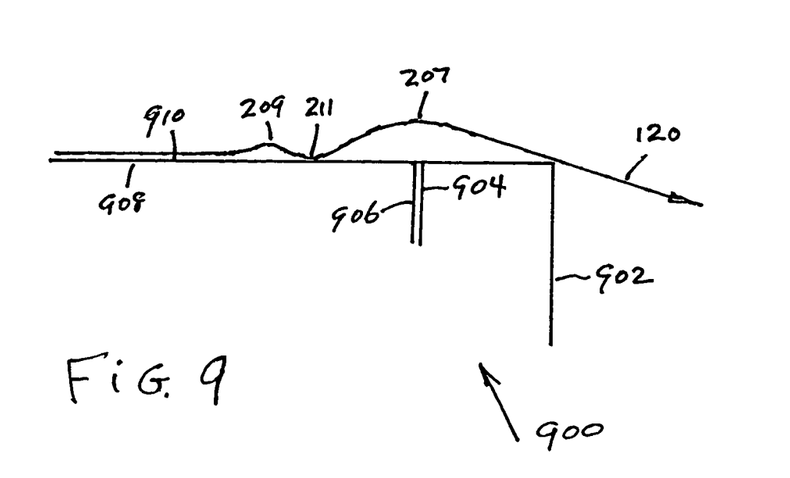
FIG. 9 is an end view illustration, not to scale, of an end portion of a canopy zone recording head.

FIG. 7, 8 and 9 illustrate third, fourth and fifth embodiments of the invention, respectively, wherein the locations of the row of transducers are displaced away from the compression zone 204 into the canopy zone 206 (see FIG. 2) by increasing the thickness of the closures that are used. FIG. 7 illustrates a "near" crow-bar zone head 700 comprising a closure 702 having a thickness slightly less than the length of the canopy zone 206 so that a transducer row 704 at the gap between the closure 702 and an edge 706 of the substrate 708 is located in a region near the crow-bar zone 211 between the primary and secondary separation zones 207 and 209. In order to locate the transducer row in the near crow-bar zone, the closure 702 has a thickness in the range of 50-200 microns depending on the wrap angle, the tape thickness and the tape tension and speed. The closure 702 may be sputter deposited over the insulation layer on transducer row 704 and is preferably formed of a layer of Al—Fe—Si, or alternatively, may be formed of a thin layer of Al—O—Ti—C, Zr—O—Ti, Si—N, Si—C or Zr—O deposited on or bonded to the insulation layer on the row of transducers.

FIG. 8 illustrates a crow-bar zone head 800 comprising a closure 802 having a thickness slightly less than the length of the canopy zone 206 so that a transducer row 804 at the gap between the closure 802 and an edge 806 of the substrate 808 is located at the crow-bar zone 211 between the primary and secondary separation zones 207 and 209. In the crow-bar zone head, the transducer row 804 is located at the position of minimum clearance of the tape 120 from the transducing surface 810 between the primary and secondary separation zones 207 and 209. In order to locate the transducer row in the crow-bar zone, the closure 802 has a thickness in the range of 50-200 microns depending on the wrap angle, the tape thickness and the tape tension and speed. The closure 802 may be sputter deposited over the insulation layer on the transducer row 804 and is preferably formed of a layer of Al—Fe—Si, or alternatively, may be formed of a thin layer of Al—O—Ti—C, Zr—O—Ti, Si—N, Si—C or Zr—O deposited on or bonded to the insulation layer on the row of transducers.

FIG. 9 illustrates a canopy zone head 900 comprising a closure 902 having a thickness approximately half the length of the canopy zone 206 so that a transducer row 904 at the gap between the closure 902 and an edge 906 of the substrate 908 is located at or near the point of maximum separation of the tape 120 from the transducing surface 910 of the substrate 908 in the primary separation zone 207. In order to locate the transducer row in the middle region of the canopy zone, the closure 902 has a thickness in the range of 10-200 microns depending on the wrap angle, the tape thickness and the tape tension and speed. The closure 902 may be sputter deposited over the insulation layer over the transducer row 904 and is preferably formed of a layer of Al—Fe—Si, or alternatively, may be formed of a thin layer of Al—O—Ti—C, Zr—O—Ti, Si—N, Si—C or Zr—O deposited on or bonded to the insulation layer on the row of transducers. The controlled separation of the transducer row 904 from the tape 120 is advantageous in low data recording density applications where transducer wear is a particular concern as, for example, in flexible card readers.

The near crow-bar zone head 700, crow-bar zone head 800 and canopy zone head 900 may all be used in a configuration having the closures facing in (toward each other) as is the case for the closures 312 and 314 in the compression zone head 300 or facing out (away from each other) as in the case of closures 512 and 514 in the compression zone head 500.

In the embodiments described herein above, the closures have preferably been made of sputter deposited layer of Al—Fe—Si, or alternatively of a deposited or bonded layer of Al—O—Ti—C, Zr—O—Ti, Si—N, Si—C or Zr—O. It will be understood to those of ordinary skill in the art that the closures may also be formed of other materials having the desired hardness and wear resistance.

In the embodiments described herein above, the compression zone recording heads comprise ceramic rowbar substrates provided with flat transducing surfaces (flat contour heads). It should be understood that heads having a shallow contour with a radius of curvature as small as 5 mm may be used with no change in the principles of operation that lead to formation of a compression zone, a canopy zone and a tack-down zone as described with respect to flat contour heads.

Figure 10:
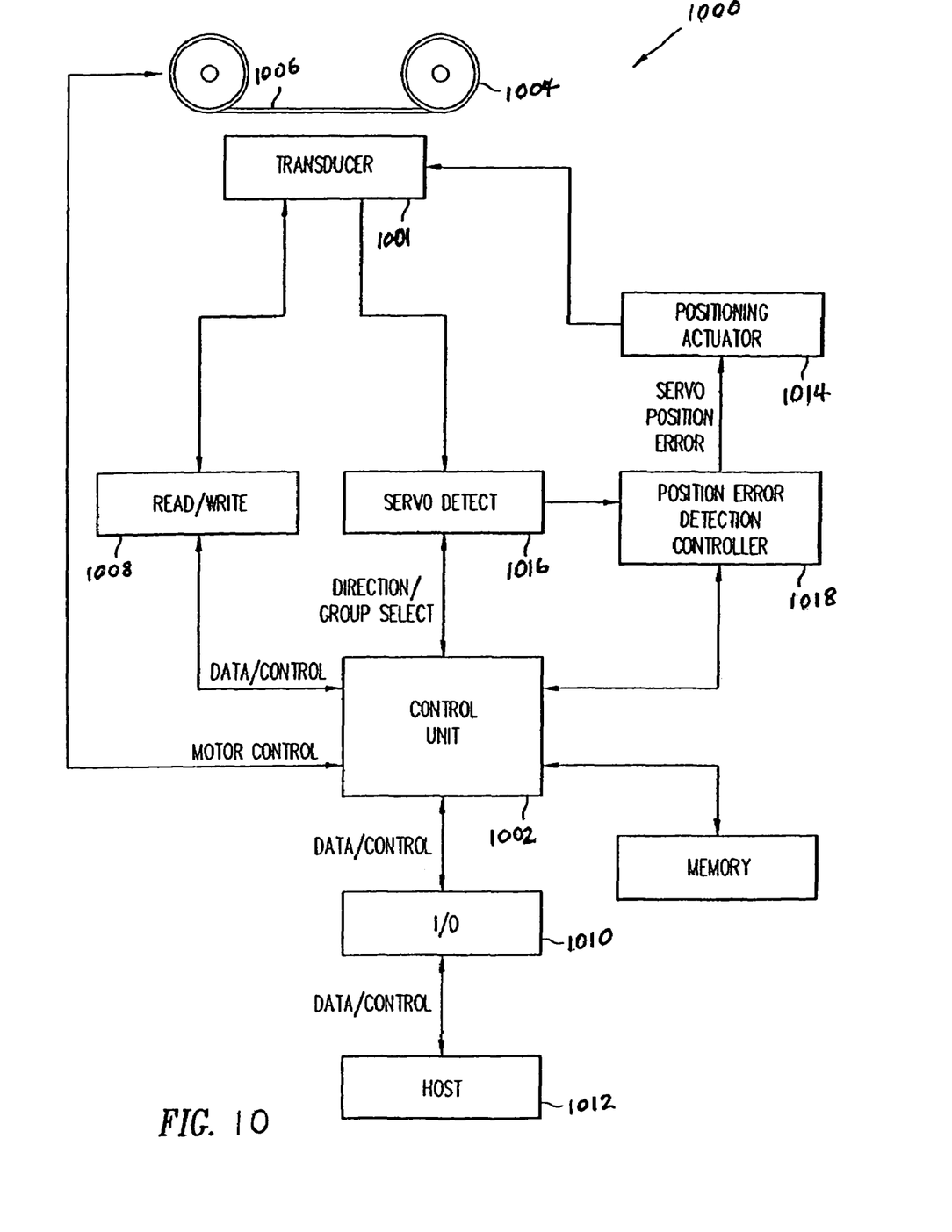
FIG. 10 is a simplified diagram of a magnetic tape recorder system using the magnetic recording head of the present invention.

FIG. 10 illustrates an embodiment of a magnetic tape recorder or tape drive system 1000 incorporating the compression zone recording head of the present invention. A tape drive control unit 1002 provides a motor control signal to rotate tape reels 1004 and move magnetic tape 1006 across the read/write transducer head 1001. Read/write channel 1008 transmits read/write signals between the read/write transducer 1001 and the control unit 1002. The data is communicated through I/O channel 1010 with host 1012. Lateral positioning of the transducer 1001 with respect to the tape 1006 is accomplished by positioning actuator 1014. The lateral repositioning is required to access the various tracks of the tape 1006 with the transducer 1001. A servo system may be employed for accurate lateral repositioning of the transducer 1001. An exemplary servo system includes a servo detector 1016 to detect both the track that the head is currently on and whether the head is off center. Control unit 1002 indicates the track address of a desired new track to position error detection controller 1018 for repositioning the head. Servo detector 1016 indicates the current track to position error detection controller 1018, and the controller provides a servo position error signal to positioning actuator 1014 which repositions the transducer 1001 to the new track. The servo system also provides track following signals to positioning actuator 1014 so that the tracks on tape 1006 may be closely spaced.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only as specified in the appended claims

We claim:

1. A magnetic head, comprising:
    a first rowbar substrate having a transducing surface and a gap surface;
    at least one thin film transducer on the gap surface of the first rowbar substrate, said thin film transducer forming a portion of said transducing surface;
    a first closure covering said thin film transducer on a side thereof opposite said gap surface of said first rowbar substrate, said first closure forming a portion of the transducing surface, wherein said first closure is formed of a layer having a thickness in the range of 0.1-200 microns;
    a second rowbar substrate having a transducing surface and a gap surface;
    at least one thin film transducer on the gap surface of the second rowbar substrate, said thin film transducer forming a portion of said transducing surface; and
    a second closure covering said thin film transducer on a side thereof opposite said gap surface of said second rowbar substrate wherein said second closure is opposite to, spaced from, and facing said first closure.

2. The magnetic head recited in claim 1, wherein the first closure is chosen from a group of materials consisting of Al—Fe—Si, Al—O—Ti—C, Zr—O—Ti, Si—N, Si—C and Zr—O.

3. The magnetic head recited in claim 1, wherein the first closure is made of a deposited layer of Al—Fe—Si.

4. The magnetic head recited in claim 1, wherein the first closure is made of a conductive material.

5. The magnetic head recited in claim 1 wherein said second closure is formed of a layer having a thickness in the range of 0.1-200 microns.

6. The magnetic head recited in claim 5, wherein said transducing surfaces of said first and second rowbar substrates are sloped downward and away from each other so as to form a wrap angle at each said gap surface thereof.

7. The magnetic head recited in claim 6, further comprising:
    a carrier mounting said first and second rowbar substrates.

8. A magnetic head, comprising:
    a first rowbar substrate having a flat transducing surface and a gap surface;
    at least one thin film transducer on the gap surface of the first rowbar substrate, said thin film transducer forming a portion of said flat transducing surface;
    a first closure covering said thin film transducer on a side thereof opposite said gap surface of said first rowbar substrate, said first closure forming a portion of the flat transducing surface, wherein said first closure is formed of a layer having a thickness in the range of 0.1-200 microns;
    a second rowbar substrate having a flat transducing surface and a gap surface;
    at least one thin film transducer on the gap surface of the second rowbar, said thin film transducer forming a portion of said flat transducing surface; and
    a second closure covering said thin film transducer on a side thereof opposite said gap surface of said second rowbar substrate, said second closure opposite to, spaced from, and facing said first closure, said second closure formed of a layer having a thickness in the range of 0.1-200 microns.

9. A magnetic tape recorder system, comprising:
    a magnetic recording tape;
    a tape drive for moving the magnetic recording tape linearly and bi-directionally;
    a magnetic head for magnetically recording data on the magnetic recording tape and for sensing magnetically recorded data on the magnetic recording tape, said magnetic head comprising:
        a first rowbar substrate having a transducing surface and a gap surface;
        at least one thin film transducer on the gap surface of the substrate, said thin film transducer forming a portion of said transducing surface;
        a first closure covering said thin film transducer on a side thereof opposite said gap surface of said substrate, said first closure forming a portion of the transducing surface, wherein said first closure is formed of a layer having a thickness in the range of 0.1-200 microns;
        a second rowbar substrate having a transducing surface and a gap surface;
        at least one thin film transducer on the gap surface of the second rowbar substrate, said thin film transducer forming a portion of said transducing surface; and
        a second closure covering said thin film transducer on a side thereof opposite said gap surface of said second rowbar substrate wherein said second closure is opposite to, spaced from, and facing said first closure; and an actuator for positioning said magnetic head to access various tracks on the magnetic recording tape; and a read/write channel coupled electrically to the magnetic head for magnetically recording data on the magnetic recording tape and for reading data recorded on the magnetic recording tape.

10. The magnetic tape recorder system recited in claim 9, wherein the first closure is chosen from a group of materials consisting of Al—Fe—Si, Al—O—Ti—C, Zr—O—Ti, Si—N, Si—C and Zr—O.

11. The magnetic tape recorder system recited in claim 9, wherein the first closure is made of a conductive material.

12. The magnetic tape recorder system recited in claim 9, wherein said second closure is formed of a layer having a thickness in the range of 0.1-200 microns.

* * * * *